Oct. 31, 1939.   G. T. RANDOL   2,177,746
CONTROL MECHANISM FOR CHANGE SPEED TRANSMISSIONS
Filed Dec. 2, 1936   4 Sheets-Sheet 3

INVENTOR
G. T. Randol.
BY
ATTORNEY

Patented Oct. 31, 1939

2,177,746

UNITED STATES PATENT OFFICE 2,177,746

CONTROL MECHANISM FOR CHANGE SPEED TRANSMISSIONS

Glenn T. Randol, Miami, Fla., assignor to The Randol Corporation, St. Louis, Mo., a corporation of Missouri Application December 2, 1936, Serial No. 113,777

19 Claims. (Cl. 74—334)

This invention relates to improvements in control mechanism for change speed gearing and more particularly to improvements in the type in which companion rotatable and slidable selectors are employed to select the speed ratios and render them active or neutral as exemplified by my Patent No. 1,576,065 issued March 9, 1926.

One of the objects of my invention is to provide improved means for selectively connecting the companion selectors to the shifting forks controlling the speed ratios.

Another object of my invention is to so construct the connecting means between the companion selectors and the shifting forks that the companion selectors cannot be connected to the shifting forks except when said members are in a predetermined position.

Still another object is to provide means in a control mechanism of the type referred to that will lock the companion selectors against rotation to select a future gear ratio as long as said members are in a position wherein a gear ratio is active.

Still a further object is to provide a control mechanism of the type referred to with companion selectors which may be locked against rotation coincidentally with the movement of the selectors away from each other for engaging a selected speed gear and wherein, when so locked, the control handle for the selectors may be manually set and retained in another position corresponding to another speed ratio, energy being stored in a spring by such movement of the handle whereby, when the selectors are subsequently moved to the neutral or extreme inward position, the selectors will be rotated by the action of the spring, thus selecting the other speed ratio.

A further object of the invention is to provide a control mechanism for a change speed gearing wherein the control handle thereof will, when moved to the indicated neutral position and while a gear ratio is active, automatically return to the active gear position if such gear has not been disengaged or neutralized by the control mechanism, thus giving the driver positive indication of the condition of the gearing prior to reengagement of the clutch when leaving the car.

Another object is to provide a control mechanism with clutch pedal operating means wherein the forward or disengaging movement of the clutch pedal is utilized to cause the control means to neutralize a speed ratio and the return movement of the pedal is utilized to render a speed ratio active and wherein spring means is employed to permit energy to be stored up during the return movement of the pedal to assist in causing the control mechanism to render a speed ratio active.

Another object is to provide a yieldable connection between a control mechanism and a clutch pedal which will yield during the return or engaging movement of the pedal in the event the gears or clutches of the change speed gearing refuse to engage due to "dead-ending" of their teeth or improper synchronization and thus allow the clutch to partially reengage in order that the gears or clutches may be rotated relatively to each other to permit easy engagement of their teeth.

Other objects will become apparent from the following description taken in connection with the accompanying drawings in which.

Referring to the drawings in detail, numeral 1 indicates the casing which is provided with a flange portion 2 for securing it to the top of the usual change speed gear housing 3 by means of suitable bolts. This casing member and my novel control mechanism contained therein are adapted to replace the conventional gear housing cover that carries the well-known gear shifting lever.

Figure 2:
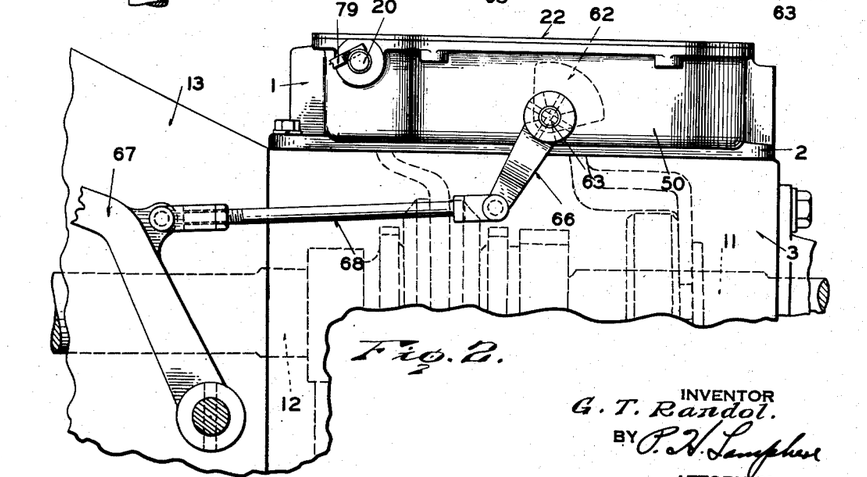
Figure 2 is a side view of the mechanism showing it on a change speed gear box, the clutch pedal also being in disengaged position.
Figures 13, 14, 15, 16, 17:
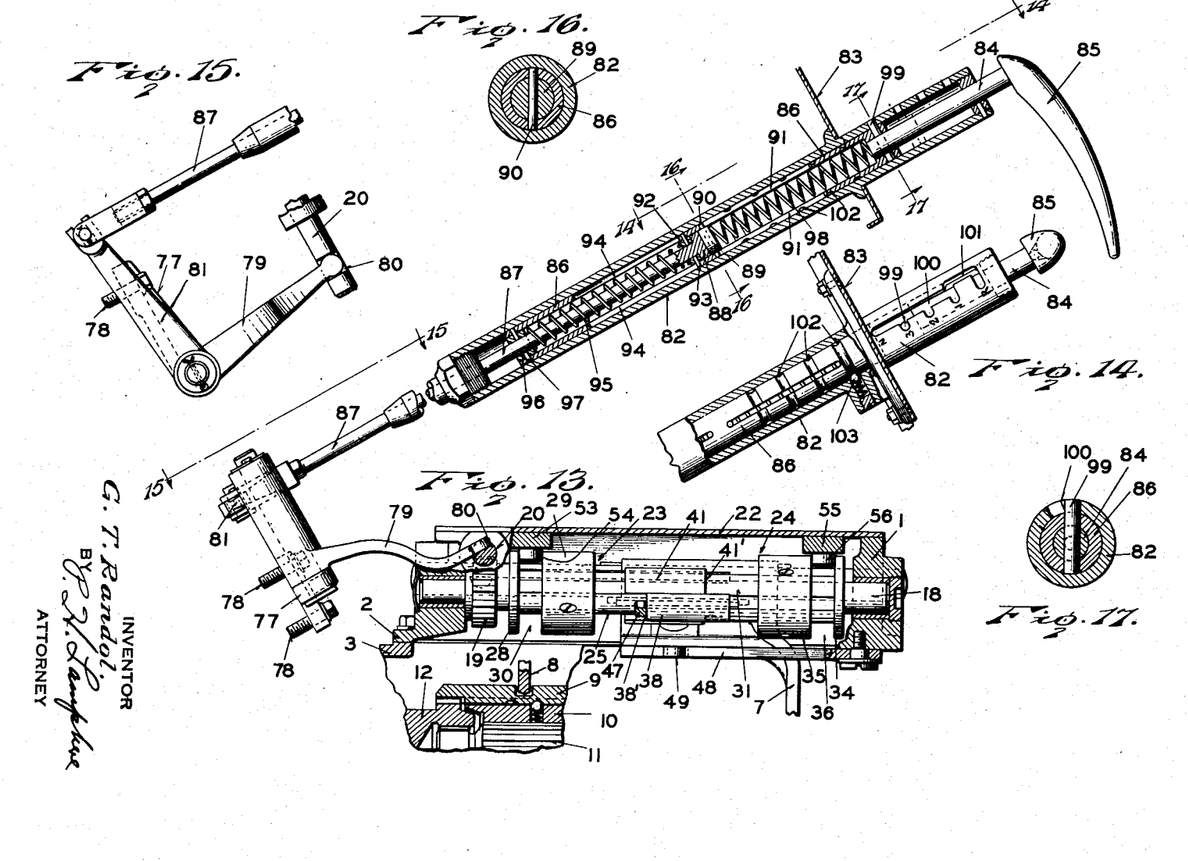
Figure 13 is a partial cross-sectional view of the entire control mechanism and the manual setting means on the instrument board of the vehicle, the cross-sectional view of the control mechanism being taken on the line 13—13 of Figure 3.
Figure 14 is a view taken on the line 14—14 of Figure 13 showing the upper part of the manual setting means, parts being shown in section.
Figure 15 is another view taken on the line 15—15 of Figure 13 showing another part of the manual setting means.
Figures 16 and 17 are cross-sectional views taken on the lines 16—16 and 17—17, respectively, of Figure 13.

The front and rear end walls of casing 1 have mounted therein removable rods 4 and 5 positioned in spaced parallel relation, the rods being held in fixed position by suitable screws 6. The rod 4 has slidably mounted thereon a shifting fork 7 for controlling either the clutch or gear for the reverse and low speed ratios of the change speed gearing, a movement of the fork rearwardly causing reverse speed to be engaged and a movement of the fork forwardly causing the first or low speed to be engaged. The rod 5 has mounted thereon a shifting fork 8 for controlling the second and high speeds of the change speed gearing, a movement of the fork rearwardly causing the second speed to be engaged and a movement of the fork forwardly causing the high speed to be engaged. In Figure 13 I have shown a small portion of one type of change speed gearing with which the control mechanism can be associated and its relation to shifting fork 8. The portion shown comprises a slidable clutch element 9 splined upon a synchronizing member 10 which, in turn, is splined upon the driven shaft 11 of the gearing. This driven shaft is piloted in the driving shaft 12 which is connected to the internal combustion engine of the vehicle through the friction clutch enclosed by the housing 13 (Figure 2). The clutch element 9 is shown as being in engagement with teeth on driving shaft 12 and when in this position, the driving shaft is directly connected to driven shaft 11 for direct or high speed drive. The portion of the gearing for the second, low or reverse speeds is not shown in full as it is conventional and believed to be unnecessary to bring out the operation of my novel control mechanism. The gear shifting fork 7 is prevented from turning on rod 4 by a key 4' and carries a spring-pressed ball detent 14 for cooperating with recesses 15 in rod 4 to yieldably hold the shifting fork in its several positions of longitudinal movement. Similarly, shifting fork 8 is prevented from turning on rod 5 by a key 5' and this fork also carries a spring-pressed ball detent 16 for cooperating with recesses 17 in rod 5 for yieldably maintaining the shifting fork in its several positions of longitudinal movement.

Figures 4, 18:
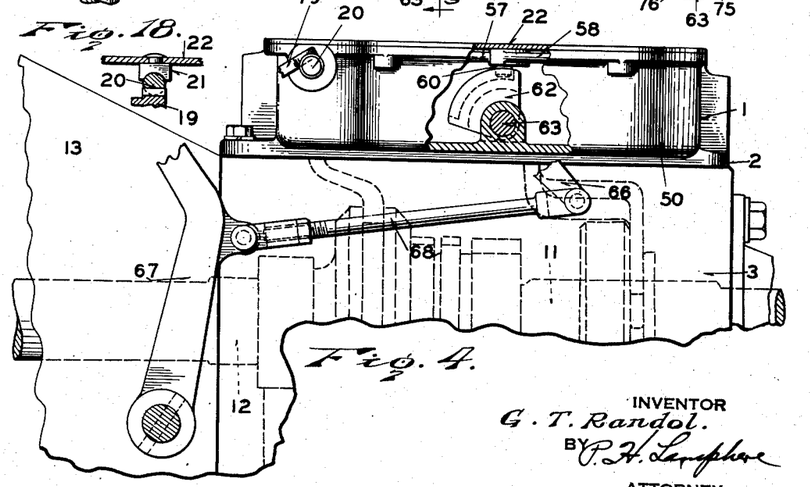
Figure 4 is a side view similar to Figure 2 with parts broken away and the clutch pedal in clutch-engaged position.
Figure 18 is a cross-sectional view showing the rack and pinion for rotating the companion selectors and the rack guide attached to the cover of the casing.

A rotatable shaft 18 is journaled in the opposite ends of casing 1 and positioned between the two rods 4 and 5, the forward end of this shaft being provided with a gear 19 (Figure 13) which is in mesh with a rack 20 leading to a manual setting mechanism whereby shaft 18 may be rotated for a purpose to become apparent. The rack 20 is held in engagement with the pinion by a suitable guide 21 fixed to the underside of cover 22 of casing 1 (Figure 18).

Figure 5:
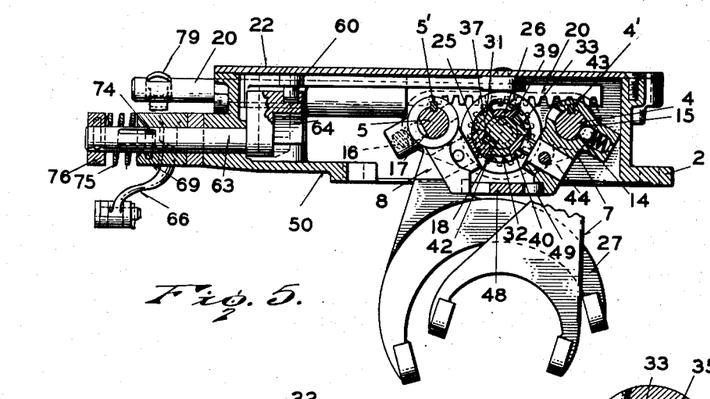
Figure 5 is a cross-sectional view taken on the line 5—5 of Figure 3.

The rotatable shaft 18 has slidably mounted thereon two companion selecting and shifting members 23 and 24 commonly known as selector members. The selector member 23 comprises three sector-shaped fingers 25, 26, and 27 connected together by an integral ring 28, and there is also provided a removable collar 29 cooperating with the end ring to provide an annular groove 30 adjacent the outer end of the selector. The selector member 24 is substantially a counterpart of selector 23 and comprises three sector-shaped fingers 31, 32, and 33 which are adapted to slidably interengage with fingers 25, 26, and 27 on selector 23, the fingers 25 and 31 being positioned adjacent each other. The fingers of selector 24 are connected together by an integral end ring 34 and there is also provided a collar 35 for forming an annular groove 36 adjacent the end of the selector. The two selectors are mounted for rotation with shaft 18 by means of a key 37 between selector 23 and the shaft (Figure 5).

The finger 25 of selector 23 is cut away in order to form a lug 38 provided with a shoulder 38' at right angles to the axis of the selector. The fingers 26 and 27 are also cut away to form ribs 39 and 40, these ribs being of a length equal to the length of lug 38 and all of them being in spaced relation to collar 29. The finger 31 of selector 24 is formed with a lug 41 provided with a shoulder 41' in the same manner as that of finger 25, and fingers 32 and 33 are cut away to form the ribs 42 and 43 of a length equal to the length of lug 41 and all in spaced relation to collar 35.

Figures 1, 20:
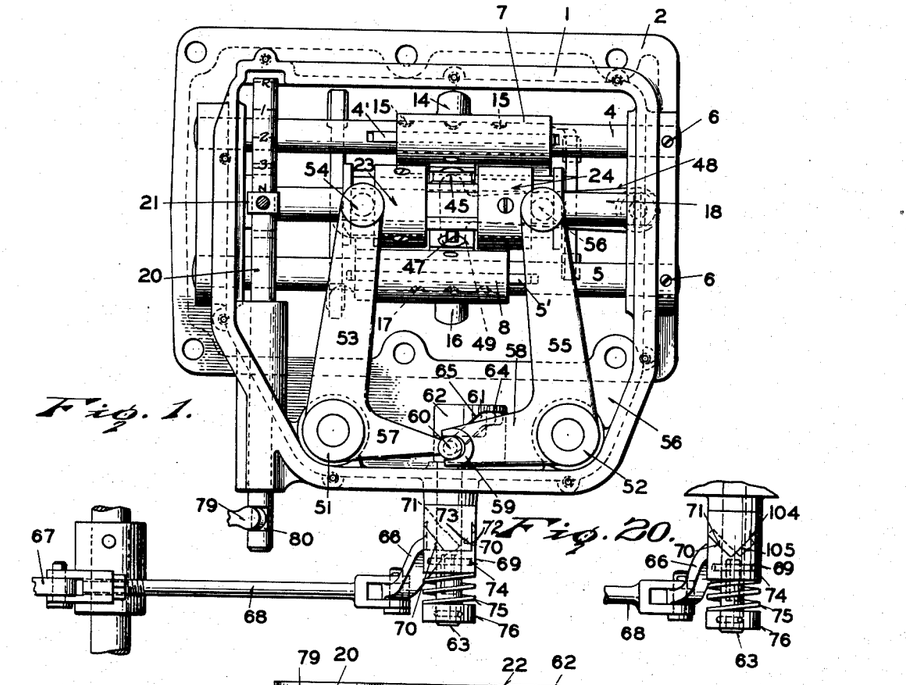
Figure 1 is a top view of the control mechanism showing the parts in neutral position and the clutch pedal in disengaged position.
Figure 20 is a view of a modified yieldable connection which may be employed in the place of that shown in Figure 19.

The portion of the hub of shifting fork 7 which lies adjacent the selectors carries a pin 44 (Figure 12) having a rectangular head 45 which is adapted to extend to a point adjacent the surfaces of the fingers formed by the portions which are cut away to produce the lugs and ribs. The hub of shifting fork 8 is also provided with a pin 46 (Figure 11) having a substantially square head 47 which is also adapted to extend to a point adjacent the surfaces of the fingers in the same manner as head 45 of the previously described pin 44. The heads of the pins 44 and 46 are adapted to cooperate with the shoulders 38' and 41' on the lugs 38 and 41 when these are in certain positions thus enabling the selectors 23 and 24 to shift the forks in opposite directions to cause a gear ratio to be active in a manner to be later described. The ribs 39, 40, 42, and 43 are also adapted to cooperate with the heads of pins 44 and 46 to prevent the selectors from turning when the selectors are in their outermost position since under these conditions the heads will lie adjacent the sides of certain ribs. The shifting forks are interlocked against simultaneous movement by means of a pivoted member 48 which has a T-shaped head 49 cooperating with grooves in the shifting forks in a manner which is well-known in the gear shifting art. It is also to be noted that collars 29 and 35 are so related to the bosses on the shifting forks 7 and 8 which carry pins 44 and 46 that they are capable of engaging these bosses to move the forks only when the selectors are moved from their outer positions (Figure 3) to their inner positions (Figure 1). This relationship is best shown in Figure 5.

The casing 1 is formed with an extended portion 50 in which is pivoted a pair of companion bell crank levers 51 and 52. The arm 53 of lever 51 extends over selector 23 and is provided with a pin 54 projecting into groove 30 of the selector whereby the selector may be moved back and forth upon shaft 18. The arm 55 of the bell crank lever 52 extends over selector 24 and also carries a pin 56 projecting into groove 36 for sliding selector 24 on shaft 18. The other arms 57 and 58 of the bell crank levers extend toward each other and are joined together for simultaneous movement by a hinge joint 59. The outer end of arm 57 at the joint carries a pin 60 projecting into a cam groove 61 in the surface of a sector member 62 carried on the inner end of shaft 63 which is suitably journaled in the wall of the casing and extends to the exterior thereof. The cam groove 61 is formed with a straight portion 64 and an inclined portion 65, the straight portion of this groove permitting free rotation of shaft 63 without any movement of the levers and the inclined portion 65 causing the two bell crank levers to be moved simultaneously in opposite directions in order to shift the selector members 23 and 24 in and out on shaft 18.

The outer end of shaft 63 has journaled thereon an arm 66 which is connected to the clutch pedal 67 by a rod 68. The connection between arm 66 and shaft 63 is such as to permit relative rotation against a yieldable member only when the clutch pedal is released after being moved forwardly to disengage the clutch. The structure employed to secure this result comprises a sleeve 69 having cam surfaces 70 for cooperation with similar cam surfaces 71 on the hub of arm 66 and shoulders 72 for cooperation with shoulders 73 on the hub of the arm. The sleeve 69 is secured to the shaft 63 by the pin and slot connection 74 which permits axial movement of the sleeve, and the sleeve is biased into engagement with the hub by a spring 75 interposed between sleeve 69 and collar 76 on the extreme outer end of shaft 63. The cooperating shoulders 72 and 73 are such that when the clutch pedal is depressed there will be a direct connection between arm 66 and shaft 63 and cam surfaces 70 and 71 are such that during the return movement of the clutch pedal, arm 66 may rotate relatively to shaft 63 and compress spring 75 by camming out sleeve 69, thereby permitting relative movement between arm 66 and shaft 63.

In the control mechanism just described, the selectors cannot be rotated except when they are in their inner position since the pins carried by the shifting forks will be opposite certain ribs and lugs on the fingers when the selectors are in their outer position. Because of this it is highly desirable that some type of manual means be employed which will not only permit the operator to directly rotate the selectors to select a speed ratio when they are in their inner position but which will also permit the operator to set for a future speed ratio while a speed ratio is active so that when the selectors are brought to their inner position, they will automatically be rotated to select the speed ratio for which the manual means is set. To secure this type of manual control of the selectors it is necessary to provide some means under the control of the operator whereby energy can be stored up to cause the proper rotation of the selectors at the desired time and this means may be either electrical, fluid or mechanical but because of simplicity I have shown spring means embodied in the manual control structure to perform the operation.

Referring to Figures 13 to 17, inclusive, the structure employed for rotating shaft 18 by means of pinion 19 and rack 20, previously referred to, comprises a bell crank member pivotally mounted in a supporting member 77 fixed to a convenient part of the vehicle (not shown) by bolts 78 and having an arm 79 engaging in a slot 80 in the exterior end of the rack. The other arm 81 of this bell crank member is positioned at substantially right angles to arm 79 for connection with the hand control device. This device comprises a tubular member 82 mounted on the instrument board 83 in the operator's compartment of the vehicle so that the upper end of the tubular member projects above the instrument board in order to be visible to the operator. A control rod 84 having a handle 85 is slidably mounted in the upper end of tubular member 82 and connected to a second tubular member 86 mounted for reciprocable movement in the main tubular member 82.

Extending into the inner tubular member is a rod 87 which is connected at its lower end to arm 81 of the bell crank secured to the rack. The inner end of this rod is formed with a head 88 and positioned in the upper portion of tubular member 86 adjacent this head is a disk 89 which carries a cross-pin 90 projecting into opposed slots 91 in the upper end of tubular member 86. The rod also has slidably mounted thereon a collar 92 positioned adjacent head 88 and this collar is provided with pins 93 projecting into opposed slots 94 in the lower end of the inner tubular member 86. A coil spring 95 surrounds rod 87 between collar 92 and the lower end of tubular member 86 which is closed by a suitable annular plug 96 pinned to the tubular member by pins 97 and slidable on rod 87, the spring biasing pins 93 of collar 92 against the upper ends of slots 94. Another spring 98 is positioned within the upper portion of the tubular member 86 between disk 89 and the upper end of the tubular member which is directly connected by pin 99 to rod 84 leading to the control handle 85. This latter spring is under compression and biases pins 90 of disk 89 against the lower ends of slots 91. This pin 99 is adapted to project into an elongated slot 100 in the upperside of the portion of the outer tubular member 82 which extends above the instrument board. The slot has communicating therewith three notches marked 1, 2, and 3 to correspond with the first, second, and third speeds of the transmission. There is also an offset slot 10 communicating with slot 100 and this offset slot has a notch marked R at the extreme upper end to correspond with the reverse speed of the transmission. The lower end of slot 100 extends below the notch marked 3 and is marked with the letter N to indicate the neutral position of the setting mechanism. The portion of pin 99 which extends into slot 100 is of such size in relation to the notches marked 1, 2, 3, and R, that it will be held in these notches when the control handle is rotated to place it therein. The inner tubular member 86 is formed with a plurality of spaced apart grooves 102 which are adapted to cooperate with a spring-pressed ball detent 103 in order to indicate to the operator that pin 99 is opposite one of the notches during the axial movement of tubular member 86 by the operation of the control handle.

In the operation of my improved control mechanism when the clutch pedal is moved forwardly to the disengaged position of the clutch, the parts 31 is in alignment with the head of pin 44 so that subsequent reengagement of the clutch will cause shifting fork 7 to be moved rearwardly along with selector 24. In the event pin 99 is placed in the reverse notch and a forward gear is active, the selectors will not be rotated but spring 95 will be compressed so that when the clutch pedal is depressed to neutralize the gearing, the selectors will be rotated by the energy of the spring to a position wherein shoulder 41 will be in alignment with the head of pin 44 in order that when the selectors are again moved apart, the reverse gear ratio will become active.

It is noted that head 47 of pin 46, which is carried by shifting fork 8, is made of substantially square formation instead of rectangular formation as is the case of head 45 of pin 44. The purpose of this is to permit a certain amount of idle movement of the selectors prior to moving the shifting fork 8, since this shifting fork, which controls the second and high speed gears, does not need to be moved as far to cause these speed ratios to be active as does shifting fork 7 which controls the low and reverse speed ratios.

Figures 6, 7, 8, 9, 10, 11, 12:
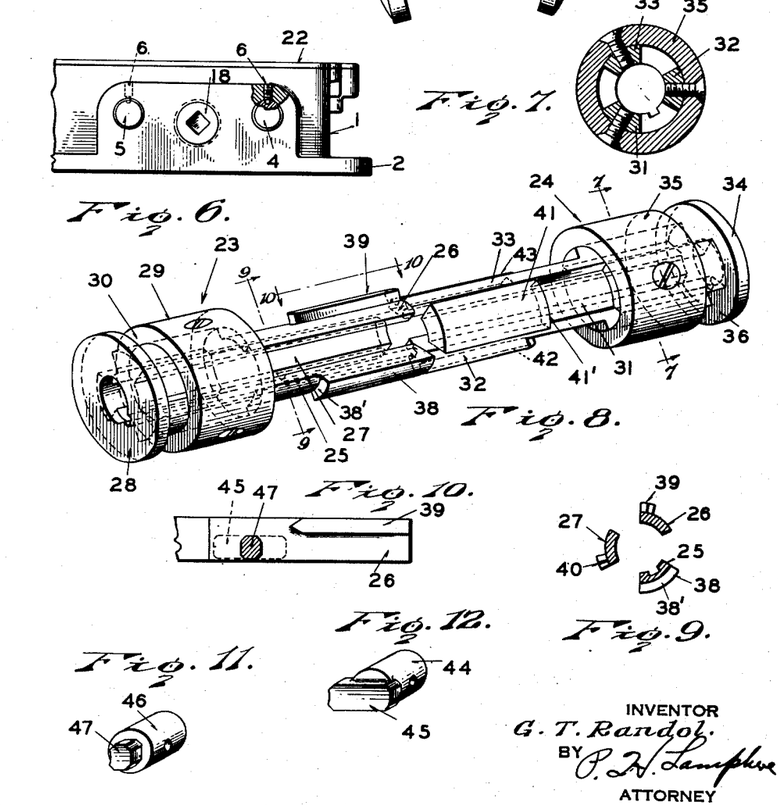
Figure 6 is an end view taken on the line 6—6 of Figure 3.
Figure 7 is a cross-sectional view taken on the line 7—7 of Figure 8 showing the construction of one end of one of the companion selectors.
Figure 8 is a perspective view of the companion selectors showing them pulled apart.
Figure 9 is a cross-sectional view taken on the line 9—9 of Figure 8 showing details of one of the selectors.
Figure 10 is a side view of one of the fingers of one of the selectors as viewed on the line 10—10 of Figure 8.
Figure 11 is a perspective view of the connecting pin or projection carried by one of the shifting forks.
Figure 12 is a perspective view of the connecting pin carried by the other shifting fork.

In Figure 10 there is shown the relationship between the heads 45 and 47 on the pins and rib 39 on finger 26 when the shifting forks and the finger are in the neutral position. The head 45 is shown in dotted lines and head 47 in cross section.

Figures 3, 19:
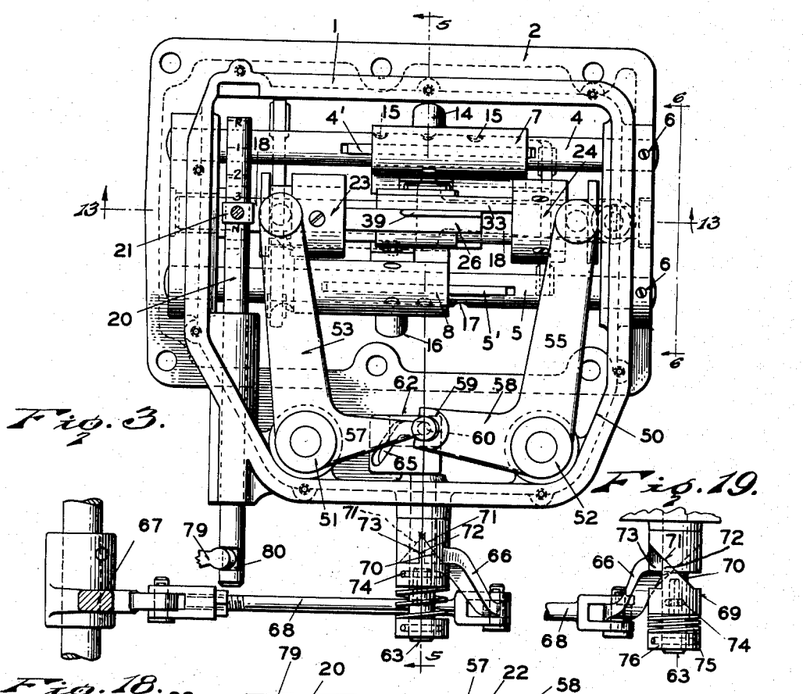
Figure 3 is a view similar to Figure 1 with the parts in a position to render the high speed gear ratio active.
Figure 19 is a view of the yieldable connection between the clutch pedal and the control mechanism showing it in one of its operative positions.

It some times may happen that during the movement of the selectors outwardly to render active a selected gear ratio, either the clutch teeth or gear teeth will "dead-end" and not readily engage, or in cases where a synchronizer is employed on the transmission, there may be improper synchronization which will resist movement of the shifting fork. Under these conditions it is found desirable to allow for a slight engagement of the clutch in order that the gears in the transmission may have sufficient slight relative movement to permit the teeth to freely engage. When such a condition arises, the yieldable connection between arm 66 and shaft 63 permits the arm to have relative movement with respect to shaft 63. The operation of this connection is best illustrated in Figure 19 wherein the relative movement between the shaft and arm has resulted in cam surfaces 71 on the arm to act on cam surfaces 70 and move sleeve 69 outwardly to compress the spring. When the yieldable connection has permitted sufficient return movement of the clutch to permit the friction surfaces thereof to engage and move the teeth of the gears or clutches of the transmission so that they will be free to engage, the stored energy in spring 75 will act through the cam surfaces to bring about rapid engagement of the teeth of the transmission clutch or gear.

By not providing a neutral notch in the end of slot 100 the operator is always informed of the condition of his transmission when he returns to his vehicle after parking it. If, for example, the engine should be turned off while the clutch is disengaged and the control handle is in the high speed position, high speed will again be engaged when the clutch pedal is released. When the operator returns to the vehicle, he will know that the transmission is still in high speed and that he must press down on the clutch pedal to neutralize it before starting the motor. If a neutral notch were employed, it would be possible to have the gearing in an active gear ratio condition and pin 99 in the neutral notch as springs 94 and 98 permit the control handle to be moved to different notches without moving the selectors. However, by not having a neutral notch any attempt to move the control handle to neutral while the gearing is in gear will be resisted by the spring which will cause the control handle to immediately bounce back as soon as the operator takes his hand off it, thus warning him that the transmission is in gear.

In Figure 20 I have shown a modified yieldable connection which, if desired, can be employed between shaft 60 and arm 66 in place of the one just described. This yieldable connection permits a slight relative rotation of the arm and the shaft in both directions in the event there should be excessive resistance to the rotation of shaft 63 in both neutralizing and rendering active a gear ratio. In the construction shown the shoulders 73 on the hub of arm 66 are replaced by the cam surfaces 104, and shoulders 72 on collar 69 are replaced by the cam surfaces 105. The rest of the structure remains the same. If during the downward movement of the clutch pedal the interengaging teeth of the active speed ratio do not readily disengage, then arm 66 will move relatively to collar 69 and cam surfaces 104 will move relatively to cam surfaces 105 and thus compress spring 75. As soon as the resistance to disengagement of the teeth is relieved, spring 75 through the cam surfaces will rotate collar 69 and hence the shaft to neutralize the gear ratio. During the return movement cam surfaces 70 and 71 function in the manner already described. It is thus seen that with the construction shown in Figure 20 there is no danger of injuring the control mechanism by a sudden depressing of the clutch pedal in the event there is resistance in the mechanism tending to retard proper operation. The construction also allows the clutch pedal to be moved through its entire path of travel as permitted by the usual floor boards, thus preventing injury to the parts by producing a yieldable clutch movement beyond that required to properly operate the control mechanism even though there is no resistance encountered.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for a change speed gearing having a longitudinally movable member for controlling a plurality of speed ratios, a selecting and shifting mechanism for said longitudinally movable member comprising two relatively axially slidable and simultaneously rotatable elements provided with axially extending fingers in overlapping relation, means for rotating said elements, means for moving said elements axially in opposite directions, means comprising cooperating rigid projections on the fingers and the longitudinally movable member for selectively connecting said elements to the movable member by a rotative movement of the elements, and other cooperating means on the fingers and the movable member for preventing rotation of said elements when the movable member is in a position to render a speed ratio active.

2. In a control mechanism for a change speed gearing having a longitudinally movable member for controlling a plurality of speed ratios, a selecting and shifting mechanism for said longitudinally movable member comprising two relatively axially slidable and simultaneously rotatable elements provided with axially extending fingers in overlapping relation, means for rotating said elements, means for moving said elements axially in opposite directions, a projection carried by the longitudinally movable member, cooperating means on each element for engaging the projection when said elements are rotated to a predetermined position whereby when said elements are moved in opposite directions the movable member will be carried with the element with which its projection engages, and ribs carried by said elements and cooperating with the projection for preventing the rotation of said elements when the movable member is in a position to render a speed ratio active.

3. In a control mechanism for a change speed gearing having a shifting fork for controlling a plurality of speed ratios, two combined rotatable and axially slidable elements for selecting and shifting said fork to secure different speed ratios, means for rotating said elements, means for moving said elements in opposite directions, means comprising cooperating rigid projections on said elements and the shifting fork for selectively connecting said elements to the fork by a rotation of said elements whereby the fork may be moved longitudinally by one of the elements, and other cooperating means on the elements and the fork for preventing rotation of said elements when the fork is in a position to render a speed ratio active.

4. In a control mechanism for a change speed gearing having a shifting fork for controlling a plurality of speed ratios, two combined rotatable and axially slidable elements for selecting and shifting said fork to secure different speed ratios, means for rotating said elements, means for moving said elements in opposite directions, means comprising cooperating rigid projections on said elements and the shifting fork for selectively connecting said elements to the fork by rotation of said elements whereby the fork may be moved longitudinally by one of the elements, and other projections on the elements for cooperating with the projections on the fork for preventing rotation of said elements when the fork is in a position to render a speed ratio active.

5. In a control mechanism for a change speed gearing having two spaced longitudinally movable shifting forks for controlling a plurality of speed ratios, a selecting and shifting mechanism for said forks comprising two relatively axially slidable and simultaneously rotatable elements provided with axially extending fingers in interengaging relation, means for rotating said elements, means for moving said elements axially in opposite directions, means comprising cooperating rigid projections on the fingers and the shifting forks for connecting a selected shifting fork to one of the elements by rotative movement of said elements whereby said fork may be moved to a position to render a speed ratio active by an axial movement of the element, and other cooperating means on the fingers and the shifting forks for preventing the rotation of said elements as long as a speed ratio is active.

6. In a control mechanism for a change speed gearing having two spaced longitudinally movable shifting forks for controlling a plurality of speed ratios, a selecting and shifting mechanism for said forks comprising two relatively axially slidable and simultaneously rotatable elements provided with axially extending fingers in interengaging relation, means for rotating said elements, means for moving said elements axially in opposite directions, a projection carried by each shifting fork, cooperating means on each element for selectively engaging the projections when said elements are rotated to a predetermined position whereby when said elements are moved in opposite directions the selected shifting fork will be carried with the element with which its projection engages, and ribs carried by said fingers and cooperating with the projection for preventing the rotation of said elements when the shifting fork is in a position to render a speed ratio active.

7. In a control mechanism for a change speed gearing having a plurality of speed ratios, combined rotatable and longitudinally slidable means for selecting and rendering active or neutral the different speed ratios, means for rotating said combined means to select a predetermined speed ratio, and means for moving said combined means longitudinally, said last named means including a manually controlled member connected to said combined means and a yieldable member in said connection whereby said manually-controlled member may transmit force through said yieldable member and as a result of the yielding thereof have limited independent movement with respect to the combined means.

8. In a motor vehicle provided with a clutch mechanism having a clutch pedal and a change speed gearing having a plurality of speed ratios, combined rotatable and longitudinally slidable means for selecting and rendering active or neutral the different speed ratios, means for rotating said combined means to select a predetermined speed ratio, means for moving said combined means axially in opposite directions, a connection between the clutch pedal and said moving means, and yieldable means in said connection whereby the clutch pedal may transmit force through said yieldable means and as a result of the yielding thereof have limited relative movement with respect to the moving means.

9. In a motor vehicle provided with a clutch mechanism having a clutch pedal and a change speed gearing having a plurality of speed ratios, combined rotatable and longitudinally slidable means for selecting and rendering active or neutral the different speed ratios, means for rotating said combined means to select a predetermined speed ratio, a pair of levers for moving said combined means axially in opposite directions, a connection between the clutch pedal and said levers, and yieldable means forming a force transmitting part of said connection whereby the clutch pedal may have limited relative movement with respect to the moving means during the clutch reengaging movement of the pedal.

10. In a motor vehicle provided with a clutch mechanism having a clutch pedal and a change speed gearing having a plurality of speed ratios, two axially slidable and simultaneously rotatable elements for selecting and rendering active or neutral the speed ratios, means for rotating said elements to select a predetermined speed ratio, a pair of levers for moving said elements axially in opposite directions, means including a rotatable cam for operating said levers simultaneously, and a yieldable connection between the clutch pedal and said cam for permitting said pedal to have independent movement with respect to the cam, said connection comprising a pair of rotatable members having cooperating inclined surfaces and a spring for yieldably holding said surfaces in engagement with each other.

11. In a control mechanism for a change speed gearing provided with a plurality of speed ratios, rotatable means for selecting said speed ratios, means for moving said rotatable means longitudinally to render the selected speed ratios active or neutral, means cooperating with the rotatable means for preventing the rotatable means from being rotated to select a succeeding speed ratio in the event one of the speed ratios is active, and means operatively associated with the rotatable means for automatically rotating said rotatable means to select the succeeding speed ratio when the active speed ratio is neutralized and including a manually settable member which may be set in a position corresponding to said succeeding speed ratio prior to the neutralization of said active speed ratio.

12. In a control mechanism for a change speed gearing provided with a plurality of speed ratios, rotatable means for selecting said speed ratios, means for rotating said rotatable means and including a manually settable member, means for moving said rotatable means longitudinally to render the selected speed ratios active or neutral, means cooperating with the rotatable means for preventing the rotatable means from being rotated to select a succeeding speed ratio in the event one of the speed ratios is active, and means for automatically rotating said rotatable means to select the succeeding speed ratio when the active speed ratio is neutralized, said automatic means being associated with and controlled by said manually settable member when placed in a position corresponding to the succeeding speed ratio and prior to the active speed ratio being neutralized.

13. In a control mechanism for a change speed gearing having a plurality of speed ratios, means including two axially slidable and simultaneously rotatable elements for selecting and rendering active or neutral the speed ratios, means for rotating said elements to select the speed ratios and including a manually settable member, means for moving said elements axially in opposite directions to render the selected speed ratios active or neutral, means associated with the elements for preventing said elements from being rotated to select a succeeding speed ratio in the event one of the speed ratios is active, and means for automatically rotating said elements to select the succeeding speed ratio when the active speed ratio is neutralized, said automatic means being operatively associated with and controlled by said manually settable member when placed in a position corresponding to the succeeding speed ratio and prior to the active speed ratio being neutralized.

14. In a control mechanism for a change speed gearing provided with a longitudinally movable member for controlling the speed ratios, combined rotatable and axially slidable elements, means for selectively connecting said elements to the longitudinally movable member, means connected to the elements for axially sliding said elements in opposite directions to move the longitudinally movable member to render a speed ratio active or neutral, means operatively associated with the elements for preventing the rotation of said elements when a speed ratio is active, and means for manually rotating said elements and including spring means for storing up energy by a movement of the manual means while a speed ratio is active to thereby cause rotation of said elements after the longitudinally movable means is moved from an active speed ratio position to its neutral position.

15. In a control mechanism for a change speed gearing provided with a longitudinally movable member for controlling a plurality of speeds, combined rotatable and axially slidable elements, means for selectively connecting said elements to the longitudinally movable member, means connected to the elements for axially sliding said elements in opposite directions to move the longitudinally movable member to render a speed ratio active or neutral, means operatively associated with the elements for preventing the rotation of said elements when a speed ratio is active, and means for manually rotating said elements and including spring means permitting the manual means to be set in a position corresponding to a succeeding gear ratio and while a gear ratio is active, said spring means being operable upon neutralization of said active gear to rotate said elements to a position where the succeeding gear ratio will be selected.

16. In a control mechanism for a change speed gearing provided with a longitudinally movable member for controlling a plurality of speeds, combined rotatable and axially slidable elements, means for selectively connecting said elements to the longitudinally movable member, means connected to the elements for axially sliding said elements in opposite directions to move the longitudinally movable member to render a speed ratio active or neutral, means operatively associated with the elements for preventing the rotation of said elements when a speed ratio is active, and means for manually rotating said elements, said manual means comprising a member connected to the elements, a handle capable of being set in a plurality of positions, and a yieldable connection between the handle and the member connected to the elements for permitting said handle to be moved relatively to the member and set in a predetermined position in the event said member cannot be moved, said yieldable connection being capable of storing up energy to move said member to a position corresponding to the set position of the handle when the axially slidable and rotative elements are in a position wherein the movable member is free to move.

17. In a control mechanism for a change speed gearing provided with a longitudinally movable member for controlling a plurality of speeds, combined rotatable and axially slidable elements, means for selectively connecting said elements to the longitudinally movable member by a rotation of said elements, means for axially sliding said elements in opposite directions to move the longitudinally movable member to render a speed ratio active or neutral, cooperating means on said elements and the longitudinally movable member for preventing the rotation of said elements when a speed ratio is active, and means for manually rotating said elements, said manual means comprising a member connected to the elements, a handle capable of being set in a plurality of positions corresponding to the active speed ratios of the gearing only, and a yieldable connection between the handle and the member connected to the elements for permitting said handle to be moved relatively to the member in the event said member cannot be moved and set in a predetermined position other than the one in which it is set but excluding the position corresponding to neutral, said yieldable connection being capable of storing up energy to move said member to a position corresponding to the set position of the handle when the axially slidable and rotative elements are in a position wherein the movable member is free to move.

18. In a motor vehicle provided with a clutch mechanism having a clutch pedal and a change speed gearing having a plurality of speed ratios, combined rotatable and axially slidable elements for selecting and rendering active or neutral the speed ratios, means for axially moving said elements by a movement of the clutch pedal to thereby render the selected speed ratio active or neutral, cooperating means on said elements and the longitudinally movable member for preventing the rotation of said elements when a speed ratio is active, and means for rotating said elements to select the speed ratios, said last named means comprising a member connected to rotate the elements, a handle capable of being set in different positions corresponding to the different speed ratios, and spring means interposed between the handle and the member permitting the handle to directly rotate the elements in the event the speed ratios are inactive or in the event a speed ratio is active permitting the handle to be moved independently of movement of the elements and to be set in a position corresponding to a succeeding speed ratio whereby said spring means will cause rotation of the elements to select the succeeding speed ratio when the active speed ratio is neutralized.

19. In a control mechanism for a change speed gearing provided with a plurality of speed ratios, means for selecting said speed ratios and rendering them active or neutral, means cooperating with the selecting means for preventing the selection of a succeeding speed ratio in the event one of the speed ratios is active, and means connected with the selecting means for automatically selecting the succeeding speed ratio when the active speed ratio is neutralized, said last named means embodying a combined rotatable and longitudinally movable manual control member for causing the automatic means to be operable, a guide having a longitudinal slot and spaced notches, and a pin on the manual control member for cooperation with the notches whereby said member may be set in a position corresponding to the succeeding speed ratio prior to the neutralization of said active speed ratio.

GLENN T. RANDOL.